Patented Jan. 6, 1953

2,624,680

UNITED STATES PATENT OFFICE 2,624,680

PLASTIC PLASTICIZED WITH ALKYL ALKOXY HYDROXY STEARATES

Daniel Swern, Philadelphia, Pa., assignor to the United States of America as represented by the Secretary of Agriculture No Drawing. Application June 27, 1950, Serial No. 170,674

6 Claims. (Cl. 106—182)

(Granted under Title 35, U. S. Code (1952), sec. 266)

The invention herein described may be manufactured and used by or for the Government of the United States of America for governmental purposes throughout the world, without the payment to me of any royalty thereon.

This invention relates to the use of certain alkyl 9,10(10,9) alkoxyhydroxystearates and 9,10(10,9) alkoxyhydroxyoctadecanols as plasticizers, these being represented by the formulas

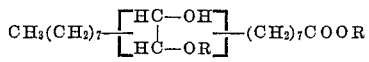

and

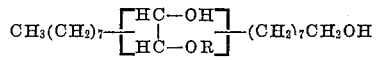

wherein R is an alkyl group containing from 1 to 4 carbon atoms. The 9,10(10,9) indicates that the stearate or octadecanol may be either the 9,10 or the 10,9 form, or a mixture of them.

Production of suitable octadecanols is disclosed in my Patent No. 2,491,533 and of suitable stearates in my copending application Serial No. 2,796, filed January 16, 1948.

In general, according to this invention, the plastics, cellulose esters, such as cellulose acetate, and vinyl chloride-vinyl acetate copolymers, have been found to be compatible with the particular plasticizers mentioned, and the plasticizer particularly an alkoxyhydroxystearate is used to plasticize these or mixtures of them to produce compositions displaying physical properties which render them valuable in the production of films, coating compositions, etc. The amount of plasticizer used is not sharply critical, but for most purposes, when cellulose acetate is the plastic, from about 5 to 10% by weight of the plasticizer, on basis of the plastic, and, when vinyl chloride-vinyl acetate copolymer is the plastic, from about 5 to 35% is preferred, depending to some extent on the particular plasticizer used.

The following examples, tabulated in Table 1, exhibit particular plastics utilizing the plasticizers mentioned. In each Example I through XIII, the plasticizer was used in conjunction with a cellulose acetate stock solution consisting of cellulose acetate, 25–34.5 g., nitropropane, 90 ml., n-butanol, 37.5 ml., ethanol (95%), 76.5 ml., and toluene, 140 ml. The plasticizer was dissolved in suitable amount (about 20 ml.) in the stock solution, and the resulting solution was spread on a glass plate (6" x 8") by means of a doctor blade. The thickness of the wet film so obtained was approximately 0.043" with the object of obtaining a dry film about 0.003–0.004" thick. The solvent was allowed to evaporate slowly, and the residual film after being removed from the plate was allowed to dry in the air for several days to ensure complete removal of the solvent.

In Examples XIV through XVIII, the plasticizer was used in conjunction with a vinyl chloride-vinyl acetate copolymer, the stock solution used being 20 g. of the copolymer (ratio of vinyl chloride to vinyl acetate being 87 to 13) per 180 g. of dioxone, the films being similarly made.

Table 1

| Example | | Plasticizer | Amount of plasticizer percent weight of dry film | Results |
|---|---|---|---|---|
| Cellulose Acetate | I | Methyl 9,10(10,9) methoxyhydroxystearate | 8.3 | Compatible. |
| | II | ....do.... | 10.0 | Slightly cloudy. |
| | III | Ethyl 9,10(10,9) ethoxyhydroxystearate | 8.0 | Do. |
| | IV | n-Butyl 9,10(10,9) n-butoxyhydroxystearate | 5.6 | Do. |
| | V | 9,10(10,9) methoxyhydroxyoctadecanol | 5.6 | Compatible. |
| | VI | ....do.... | 10.0 | Slightly cloudy. |
| | VII | 9,10(10,9) ethoxyhydroxyoctadecanol | 5.1–7.6 | Compatible. |
| | VIII | 9,10(10,9) n-propoxyhydroxyoctadecanol | 5.6 | Do. |
| | IX | ....do.... | 10.2 | Slightly cloudy. |
| | X | 9,10(10,9) n-butoxyhydroxyoctadecanol | 5.5 | Compatible. |
| | XI | ....do.... | 10.0 | Slightly cloudy. |
| | XII | 9,10(10,9) i-butoxyhydroxyoctadecanol | 5.8 | Compatible. |
| | XIII | ....do.... | 11.1 | Slightly cloudy. |
| Polyvinyl Chloride Acetate | XIV | Methyl 9,10(10,9) methoxyhydroxystearate | 5–35.6 | Compatible. |
| | XV | Ethyl 9,10(10,9) ethoxyhydroxystearate | 5.4 | Do. |
| | XVI | ....do.... | 11.1 | Slightly greasy. |
| | XVII | n-Butyl 9,10(10,9) n-butoxyhydroxystearate | 5.1 | Compatible. |
| | XVIII | i-Butyl 9,10(10,9) i-butoxyhydroxystearate | 5.3 | Do. |

Results similar to Examples XIV through XVIII are obtained using other stock solutions of the copolymer in which the ratio of vinyl chloride to vinyl acetate is changed.

I claim:

1. A plastic selected from the group consisting of cellulose esters, a vinyl chloride-vinyl acetate copolymer, and mixtures thereof, plasticized with a plasticizer corresponding to the formula $$CH_3(CH_2)_7 - \begin{bmatrix} HC-OH \\ HC-OR \end{bmatrix} - (CH_2)_7 COOR$$

wherein R is an alkyl group containing from 1 to 4 carbon atoms.

2. Cellulose acetate plasticized with a plasticizer corresponding to the formula $$CH_3(CH_2)_7 - \begin{bmatrix} HC-OH \\ HC-OR \end{bmatrix} - (CH_2)_7 COOR$$

wherein R is an alkyl group containing from 1 to 4 carbon atoms.

3. Cellulose acetate plasticized with methyl 9,10(10,9) methoxyhydroxystearate.

4. A vinyl chloride-vinyl acetate copolymer plasticized with a plasticizer corresponding to the formula $$CH_3(CH_2)_7 - \begin{bmatrix} HC-OH \\ HC-OR \end{bmatrix} - (CH_2)_7 COOR$$

wherein R is an alkyl group containing from 1 to 4 carbon atoms.

5. A vinyl chloride-vinyl acetate copolymer plasticized with methyl 9,10(10,9) methoxyhydroxystearate.

6. A cellulose ester plasticized with a compound corresponding to the formula $$CH_3(CH_2)_7 - \begin{bmatrix} HC-OH \\ HC-OR \end{bmatrix} - (CH_2)_7 COOR$$

wherein R is an alkyl group containing from 1 to 4 carbon atoms.

DANIEL SWERN.

REFERENCES CITED

The following references are of record in the file of this patent:

UNITED STATES PATENTS

| Number | Name | Date |
|---|---|---|
| 2,332,849 | Gruber et al. | Oct. 26, 1943 |
| 2,357,833 | Kropscott et al. | Sept. 12, 1944 |
| 2,491,533 | Swern | Dec. 20, 1949 |